(12) United States Patent
Wright

(10) Patent No.: US 9,434,808 B2
(45) Date of Patent: *Sep. 6, 2016

(54) PROCESS FOR PREPARING POLYMERS, POLYMERS, DISPERSIONS, INKS AND USES

(75) Inventor: Gavin Wright, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 195 days.

This patent is subject to a terminal disclaimer.

(21) Appl. No.: 14/130,948

(22) PCT Filed: Jul. 2, 2012

(86) PCT No.: PCT/GB2012/051542
§ 371 (c)(1),
(2), (4) Date: Mar. 5, 2014

(87) PCT Pub. No.: WO2013/005019
PCT Pub. Date: Jan. 10, 2013

(65) Prior Publication Data
US 2014/0309364 A1   Oct. 16, 2014

(30) Foreign Application Priority Data

Jul. 7, 2011 (GB) .................................. 1111583.9

(51) Int. Cl.
| | | |
|---|---|---|
| C08G 18/08 | (2006.01) | |
| C08G 18/32 | (2006.01) | |
| C08G 18/38 | (2006.01) | |
| C08G 18/75 | (2006.01) | |
| C08G 18/76 | (2006.01) | |
| C09D 11/30 | (2014.01) | |
| C09D 11/102 | (2014.01) | |
| C09D 11/326 | (2014.01) | |
| C09D 175/04 | (2006.01) | |

(52) U.S. Cl.
CPC ....... C08G 18/3853 (2013.01); C08G 18/0819 (2013.01); C08G 18/0823 (2013.01); C08G 18/3206 (2013.01); C08G 18/3808 (2013.01); C08G 18/3851 (2013.01); C08G 18/755 (2013.01); C08G 18/7671 (2013.01); C09D 11/102 (2013.01); C09D 11/30 (2013.01); C09D 11/326 (2013.01); C09D 175/04 (2013.01)

(58) Field of Classification Search
CPC .......... C08G 18/3853; C08G 18/0819; C08G 18/0823; C08G 18/3206; C08G 18/3808; C08G 18/3851; C08G 18/755; C08G 18/7671; C09D 11/102; C09D 11/326; C09D 11/30; C09D 175/04
See application file for complete search history.

(56) References Cited

U.S. PATENT DOCUMENTS

| | | | |
|---|---|---|---|
| 3,505,326 A | * | 4/1970 | Shaw .................... C07D 251/42 252/401 |
| 3,573,301 A | | 3/1971 | Winter |
| 3,622,339 A | | 11/1971 | Nishio et al. |
| 4,125,413 A | | 11/1978 | Davies et al. |
| 4,314,001 A | | 2/1982 | Wesseler |
| 4,562,246 A | | 12/1985 | Wang et al. |
| 4,812,492 A | | 3/1989 | Eckes et al. |
| 5,051,464 A | | 9/1991 | Johnson et al. |
| 5,200,445 A | | 4/1993 | Cipolli et al. |
| 5,240,499 A | | 8/1993 | Az et al. |
| 5,534,573 A | | 7/1996 | Leake |
| 5,969,002 A | | 10/1999 | Kijlstra et al. |
| 6,034,154 A | | 3/2000 | Kase et al. |
| 6,136,890 A | | 10/2000 | Carlson et al. |
| 6,316,619 B1 | | 11/2001 | Miyake et al. |

(Continued)

FOREIGN PATENT DOCUMENTS

| | | |
|---|---|---|
| EP | 0018099 A2 | 10/1980 |
| JP | 2004-175861 A | 6/2004 |

(Continued)

OTHER PUBLICATIONS

Database WPI Week 200482, Thomson Scientific, London, GB; An 2004-825169.

*Primary Examiner* — Patrick Niland
(74) *Attorney, Agent, or Firm* — Banner & Witcoff, Ltd.

(57) ABSTRACT

A process for preparing a polymer comprising reacting at least the components i), ii) and optionally iii) to form a pre-polymer: i) a compound of the Formula (1); wherein: $T^1$ and $T^2$ are each independently HO—, HS— or $HNR^1$—; $Q^1$ and $Q^2$ independently are $—NR^2—$; $A^1$ and $A^2$ independently are an optionally substituted divalent organic linking group; Z is a halogen; $R^1$ when present is H or an optionally substituted alkyl, aryl or heterocyclyl group; $R^2$ is H or an optionally substituted alkyl, aryl or heterocyclyl group; ii) a diisocyanate; iii) optionally an isocyanate reactive compound; and then reacting the pre-polymer with at least component iv): iv) one or more compounds selected from an organic amine, alcohol or thiol provided that at least one of the organic compounds in component iv) has at least one ionic group.

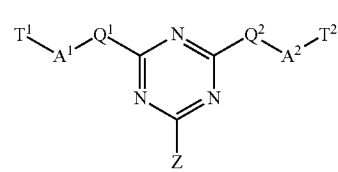

Formula (1)

21 Claims, No Drawings

(56) References Cited

U.S. PATENT DOCUMENTS

| | | | |
|---|---|---|---|
| 6,455,611 B1* | 9/2002 | Pears | C08G 18/0823 106/31.13 |
| 7,524,892 B2 | 4/2009 | Kataoka et al. | |
| 7,858,676 B2 | 12/2010 | Waki et al. | |
| 9,068,092 B2* | 6/2015 | Wright | C08G 18/0823 |
| 2004/0147633 A1* | 7/2004 | Kamikubo | C09D 11/326 523/160 |
| 2004/0260013 A1 | 12/2004 | Richards | |
| 2005/0017285 A1 | 1/2005 | Tzeng et al. | |
| 2008/0002004 A1 | 1/2008 | O'Donnell et al. | |
| 2008/0178395 A1* | 7/2008 | Ouziel | C07D 251/50 8/115.6 |
| 2011/0060102 A1 | 3/2011 | Li et al. | |
| 2011/0169900 A1 | 7/2011 | Annable et al. | |
| 2014/0168333 A1* | 6/2014 | Wright | B41J 2/175 347/100 |

FOREIGN PATENT DOCUMENTS

| | | |
|---|---|---|
| JP | 2004-315716 A | 11/2004 |
| JP | 2008-266595 A | 11/2008 |
| JP | 2008-295837 A | 12/2008 |

* cited by examiner

PROCESS FOR PREPARING POLYMERS, POLYMERS, DISPERSIONS, INKS AND USES

RELATED APPLICATION DATA

This application is a National Stage Application under 35 U.S.C. 371 of co-pending PCT application PCT/GB2012/051542 designating the United States and filed Jul. 2, 2012; which claims the benefit of GB application number 1111583.9 and filed Jul. 7, 2011 each of which are hereby incorporated by reference in their entireties.

TECHNICAL FIELD

This invention relates to a process for preparing polymers containing triazine groups, it further relates to the polymers themselves. It relates to dispersions and inks (especially ink jet printing inks) containing said polymers. It also relates to the use of the polymers for dispersing or comminuting (e.g. milling) a particulate solid so as to form a liquid dispersion.

BACKGROUND

Inks are often of one of two types, depending on the type of colorant used. Dye-based inks often comprise a dye dissolved in a liquid medium. Pigment inks comprise a pigment dispersed in a particulate form in a liquid medium. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been directed towards attempting to provide sub micron sized pigment dispersions and increase the colloidal stability of these pigment dispersions.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic solvent to assist in dissolving/dispersing the dispersant, for example in the pigment dispersion or comminution step.

Further, it is desirable that a dispersant is effective in the dispersion or comminution process. Quicker comminution (e.g. milling) to submicron particles sizes saves substantial energy and it may also result in less pigment particles having a particles size markedly smaller than the target size. Particles much below the target size are often referred to as fines.

Pigment based inks when printed onto a substrate often produce final images that are not firmly secured to the substrate surface. Prints from pigment based inks often exhibit poor rub fastness, water-fastness or highlighter smear fastness.

Aqueous inks and ink jet printing inks require very different polymers as dispersant from organic inks. The present invention also aims to provide polymers suitable as dispersants for particulate solids in aqueous liquid vehicles. In addition the present invention attempts to provide polymers which can colloidally stabilise dispersions of particulate solids even when large amounts of organic liquid are present in combination with water.

Commercially, there still remains a need for dispersants which can be used to prepare pigment inks and which solve, at least in part, one or more of the abovementioned problems.

PRIOR ART

Japanese patent publication JP2004-315716 discloses polymers containing triazine rings which are useful as dispersants. This patent publication does not mention introducing ionic groups nor does it provide a disclosure of a process by which ionic groups could be incorporated.

DETAILED DESCRIPTION

According to a first aspect of the present invention there is provided a process for preparing a polymer comprising reacting at least the components i), ii) and optionally iii) to form a pre-polymer:

i) a compound of the Formula (1);

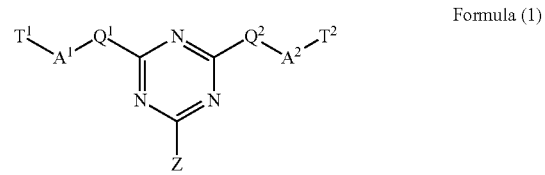

Formula (1)

wherein:
T$^1$ and T$^2$ are each independently HO—, HS— or HNR$^1$—;
Q$^1$ and Q$^2$ independently are —NR$^2$—;
A$^1$ and A$^2$ independently are an optionally substituted divalent organic linking group;
Z is a halogen;
R$^1$ when present is H or an optionally substituted alkyl, aryl or heterocyclyl group;
R$^2$ is H or an optionally substituted alkyl, aryl or heterocyclyl group;
ii) a diisocyanate;
iii) optionally an isocyanate reactive compound;
and then reacting the pre-polymer with at least component iv):
iv) one or more compounds selected from an organic amine, alcohol or thiol provided that at least one of the organic compounds in component iv) has at least one ionic group.

DEFINITIONS

Unless stated to the contrary, in the present patent the words "a" and "an" are meant to include the possibility of using one or more of that item. Thus, a compound of Formula (1) means one or more compounds of Formula (1). Similarly, a diisocyanate means one or more diisocyanates.

Isomers

Whilst the compounds as described in the first aspect of the present invention have been drawn in one structural formula the compounds and the scope of the claims are also intended to cover several isomers thereof including for example: tautomers, optical isomers, isotopic isomers etc.

Compound of Formula (1)

Preferably, the compound of Formula (1) has no ionic groups. This helps to prevent gelation, or branching and allows the preparation of the pre-polymer and polymer having a linear structure. Preferably, the only hydroxyl, thiol or amine groups present in the compound of Formula (1) are those possible from the $T^1$ and $T^2$ groups.

$T^1$ and $T^2$

Preferably, $T^1$ and $T^2$ are each independently HO— or $HNR^1$—, more preferably $T^1$ and $T^2$ are HO—. Accordingly, it is preferred that the compound of Formula (1) is a diamine or a diol, more preferably a diol. When $T^1$ and $T^2$ are both HO— the pre-polymer and the final polymer are of course polyurethanes.

When $T^1$ and/or $T^2$ is $HNR^1$— it is preferred that the reactivity of this group is relatively low towards halo triazines when compared to amine groups in general. One way of achieving the desired lower reactivity is use primary amines wherein $R^1$ is H. In such a case it is often desirable that $R^2$ is not H but is optionally substituted alkyl, aryl or heterocyclyl.

$R^1$ and $R^2$

When an $R^1$ or $R^2$ group is an optionally substituted alkyl group, it is preferably optionally substituted $C_{1-20}$ alkyl.

When an $R^1$ or $R^2$ group is an optionally substituted aryl group it is preferably an optionally substituted phenyl or naphthyl group.

When an $R^1$ or $R^2$ group is an optionally substituted heterocyclyl it may be aromatic (heteroaryl) or non aromatic. When $R^1$ or $R^2$ is heterocyclyl it is preferably a 5- or 6-membered ring containing from 1 to 3 atoms selected from N, S and O in the ring. The remaining atoms being carbon atoms.

Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

Preferably, $R^2$ is H. This is especially so when $T^1$ and $T^2$ are both HO—.

Optional Substituents

When $R^1$ or $R^2$ is not H, the optional substituents for $R^1$ or $R^2$ preferably independently include —$NO_2$, CN, halo (especially Cl, F, Br and I), —$NHC(O)C_{1-6}$ alkyl, —$SO_2NHC_{1-6}$alkyl, —$SO_2C_{1-6}$alkyl, —$C_{1-6}$alkyl, —$OC_{1-6}$alkyl, —$OC(O)C_{1-6}$alkyl, polypropyleneoxide ending in a $C_{1-6}$alkyl group, polyethyleneoxide ending in a $C_{1-6}$ alkyl group. It is preferred that all the $R^1$ and $R^2$ groups have no ionic, thiol, amine, hydrazo ($H_2NNH$—) or hydroxyl (HO—) groups. We have found that the presence of such groups in the $R^1$ and $R^2$ position tends to promote unwanted gelation in the subsequent reaction with the diisocyanate in component ii).

The optional substituents for $R^1$ and $R^2$ may also be used as optional substituents for any other group which mentions the possibility of being optionally substituted. Thus for example these groups may be substituents on $A^1$ and $A^2$ groups.

Each $R^2$ group is preferably independently a H or $C_{1-6}$ alkyl group, more preferably all the $R^2$ groups are H. When all the $R^2$ groups are H this means the compound of Formula (1) may be prepared from compounds which have a primary amine group. We have found that the primary amines allow particularly effective reaction with halo triazines so as to prepare the compound of Formula (1) in good yield and purity.

$A^1$ and $A^2$

The groups $A^1$ and $A^2$ may be any optionally substituted divalent organic linking group.

$A^1$ and $A^2$ may be an alkylene, a cycloalkylene, arylene, or heterocyclylene group which may be optionally interrupted by other groups. Of these alkylene groups are preferred. The heterocyclylene groups may be aromatic or non-aromatic. The groups $A^1$ and $A^2$ may be combinations of alkylene, arylene and heterocyclylene groups. The groups $A^1$ and $A^2$ may be interrupted by groups such as —O—, —S—, —$CO_2$—, —NHCO—, —$SO_2$— and —$NHSO_2$—. Preferably $A^1$ and $A^2$ are each independently an arylene, an alkylene or a combination thereof. $A^1$ and $A^2$ may be optionally substituted with one of more or the optional substituents as mentioned for $R^1$ and $R^2$. In some embodiments $A^1$ and/or $A^2$ is/are unsubstituted.

Preferably both the groups $A^1$ and $A^2$ have no ionic, amine, hydrazo ($NH_2NH$—) thiol or hydroxyl groups. This helps to prevent any gelation in the subsequent reaction with the diisocyanate in component ii).

When $A^1$ or $A^2$ is arylene it is preferably divalent naphthylene or phenylene. When $A^1$ is phenylene the linking groups to $T^1$ and $Q^1$ may be arranged in an ortho, meta or more preferably a para position. The same is preferred for $A^2$ wherein the linking groups are now $T^2$ and $Q^2$.

When $A^1$ or $A^2$ is an alkylene group it is preferably a $C_{1-30}$ alkylene, especially a $C_{1-20}$ alkylene and most especially a $C_{2-8}$ alkylene. The alkylene groups may be branched or linear. Preferred examples are —$(CH_2)_{1-20}$— groups, examples of which are $(CH_2)_2$, $(CH_2)_3$, $(CH_2)_4$, $(CH_2)_6$ and $(CH_2)_8$.

$A^1$ and $A^2$ may be a xylylene group (—$CH_2$-phenylene-$CH_2$—), in which the $CH_2$ groups may be ortho, meta or para with respect to the phenylene ring.

In view of the foregoing, preferably $A^1$ and $A^2$ are independently selected from $C_{1-30}$ alkylene, a phenylene, a naphthylene and a xylylene group each of which may be optionally substituted. More preferably $A^1$ and $A^2$ are independently selected from optionally substituted $C_{1-30}$ alkylene groups, preferred examples of which are mentioned above.

Preferred specific examples of $A^1$ and $A^2$ groups are *$CH_2CH_2$*, *$CH_2CH$*$CH_3$, *$CH_2CH$*$CH_2CH_3$ and ortho, para and meta-phenylene wherein the asterisk marks the point of attachment of the groups in the compound of Formula (1).

The groups $A^1$ and $A^2$ may be different but more preferably they are the same.

Z

The group Z may be any halogen without limitation. Preferred halogens include F, Cl, Br and I. Of these, Cl is especially preferred.

Preparation of the Compounds of Formula (1)

The compounds of Formula (1) are preferably prepared by reacting compounds of the Formulae:

$T^1A^1Q^1H$ and $T^2A^2Q^2H$ with a trihalo-triazine wherein $T^1$, $A^1$, $Q^1$ and $T^2$, $A^2$ and $Q^2$ are as herein before described and preferred.

Of course, in some cases $T^1A^1Q^1H$ and $T^2A^2Q^2H$ may be the same compound.

As mentioned $T^1$ and $T^2$ are preferably both —OH. Thus for preferred compounds of the Formulae (1) $T^1A^1Q^1H$ and $T^2A^2Q^2H$ are monoamino-monoalcohols.

Especially preferred examples are ethanolamine (HO—CH$_2$CH$_2$—NH$_2$), CH$_3$CH(OH)CH$_2$NH$_2$, CH$_3$CH$_2$CH(OH) CH$_2$NH$_2$, and HO-phenylene-NH$_2$ and HOCH$_2$-phenylene-CH$_2$—NH$_2$. Other suitable examples of monoamino-monoalcohols include 3-amino propanol, 4-amino butanol, 2-amino-2-methyl-1-propanol, 5-amino pentanol, 6-amino hexanol and 8-amino octanol.

The corresponding monoamino-monothiols may also be used.

The halo groups in the halo-triazine may be I, Br, Cl or F but is preferably chlorine and thus the preferred trihalo-triazine is cyanuric chloride.

The compound of Formula (1) is preferably prepared by the above reaction whilst maintaining moderate to low temperatures. Preferably the trihalo-triazine is suspended in a liquid medium at a temperature of less than 10° C., preferably from −5° C. to 5° C.

It is then preferred to add the compounds of Formulae $T^1A^1Q^1H$ and $T^2A^2Q^2H$ to the trihalo-triazine to form a reaction mixture. On completion of this addition it is preferred to heat the reaction mixture to 30 to 50° C., more preferably 40 to 45° C. This temperature is preferably maintained for a period of 1 to 10 hours, more preferably 2 to 4 hours and especially about 3 hours. The pH for the reaction is preferably from 5 to 9, more preferably from 6 to 7. Any suitable base may be used to obtain this pH. Preferred bases are alkali metal hydroxides, especially sodium hydroxide. Preferably, the reaction is completed by raising the temperature to from 50 to 80° C., more preferably from 50 to 70° C. and especially to around 60° C. Preferably, the raised temperature is maintained for a period of 1 to 5, more preferably from 1 to 3 hours and especially about 2 hours.

Preferably, the molar amounts of $T^1A^1Q^1H$ and $T^2A^2Q^2H$ and trihalo-triazine correspond approximately to the theoretical structure (i.e. 1 mole: 1 mole: 1 mole).

The reaction is preferably carried out in a liquid medium which is preferably aqueous, more preferably comprises of water and no other liquid. Organic liquids may also be used, alone or in combination with water. Suitable examples of organic liquids include N-methyl pyrrolidone and sulfolane.

The above reaction may prepare a single compound of Formula (1) or a number of different compounds having the Formula (1).

The compounds of Formula (1) may be used directly however it is often preferable to purify the compound of Formula (1). The compound of Formula (1) may be isolated on a filter and washed with pure liquid medium. The compound of Formula (1) may be ultrafiltered using a membrane purification process.

It is sometimes useful to isolate the compound of Formula (1) in a dry form. Preferred drying methods include vacuum drying, oven drying, spray drying and the like. If the isolated compound of Formula (1) is not totally dry then the amount of residual water can be determined and accounted for in the polymerisation reaction by incorporating additional diisocyanate.

Diisocyanate

The diisocyanate may be of any kind without any particular limitations. The diisocyanate may be aliphatic, aromatic or a mixture of both. Mixtures of diisocyanates may be used. Preferably, the diisocyanate has no ionic, amino, hydrazo (HN$_2$HN—), thiol or hydroxyl groups. This helps to prevent gelation or branching.

Preferred examples of suitable diisocyanates include ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, 1,5-naphthylene diisocyanate and isophorone diisocyanate. Of these isophorone diisocyanate is especially preferred.

It is possible, though not preferable, to prepare the pre-polymer by reacting components i), ii) and optionally iii) along with some isocyanates having three or more isocyanate groups and/or some isocyanates having just one isocyanate group. If such isocyanates are used they are preferably only present in minor proportions. More preferably, the only isocyanates used in the preparation of the pre-polymer are diisocyanates.

Isocyanate Reactive Compound

Component iii) is preferably present in the preparation of the polymer according to the first aspect of the present invention.

Of course, as used herein the term isocyanate reactive compound in component iii) means isocyanate reactive compounds other than those of Formula (1).

Preferred examples of isocyanate reactive compounds are those having hydroxyl, thiol, amino and hydrazo (HN$_2$—NH—) groups (as isocyanate reactive groups). Preferably, the isocyanate reactive compound has only two groups selected from hydroxyl, thiol, amino and hydrazo groups. In this way the isocyanate reactive compounds assist in producing a linear pre-polymer, they tend not to produce branched or gelled polymers.

It is also preferred that the isocyanate reactive compounds have no ionic groups, especially no carboxylic acid, sulfonic acid or phosphorus containing acid groups. This again helps to prevent the formation of gel whilst the polymer is being formed. The isocyanate reactive compounds may be aliphatic, aromatic or a mixture thereof.

Preferred examples of isocyanate reactive compounds include diamines, diols and dithiols. Of these diamines and especially diols are preferred.

Preferred diols include ethyleneglycol, 1,2- and 1,3-propyleneglycol, 1,2-; 1,3-; 1,4-; and 2,3-butylene glycols, 1,6-hexanediol and neopentyl glycol, 1,8-octanediol, bis-phenol A, cyclohexane diol, diethylene glycol, triethylene glycol, tetraethylene glycol, polyethylene glycol, dipropylene glycol, polypropylene glycol, dibutyleneglycol and the like. Of these ethylene glycol is especially preferred.

Preferred diamines include ethylene diamine, 1,2- and 1,3-propane diamine, 1,4-butane diamine, 1,5-pentane diamine, 1,6-hexane diamine, isophorone diamine, cyclohexane diamine, piperaine, 4,4'-methylene bis(cyclohexyl amine) and polyoxyalkylene diamines for example those sold under the Jeffamine™ tradename.

Preferred dihydrazos include hydrazine and adipic acid dihydrazide.

Component iii) may comprise mixtures of different isocyanate reactive compounds.

Groups in the Final Polymer

We have found that the presence of certain groups in the final polymer tends to reduce the final optical density achievable when the polymer is used to prepare a pigment-based ink. Groups of this kind include poly(ethyleneoxy) and polyester groups. Preferably to obtain the best possible optical density, the final polymer has no such groups. More preferably component iii) contains no compound which is or has such groups. Thus it is especially preferred that none of the compounds in component iii) comprises poly(ethyleneoxy) or polyester groups. For example the compounds in component iii) should not include alcohols, amines or thiols having poly(alkyleneoxy) or polyester groups.

It is possible that small proportions of isocyanate reactive compounds in component iii) have one or three or more isocyanate reactive groups. Preferably, the content of such isocyanate reactive compounds in component iii) having one or three or more isocyanate reactive groups is relatively low so as not to make the pre-polymer molecular weight too low or make the pre-polymer too branched or gelled.

Preferred Absence of Chromophores

Preferably, no component used in the synthetic preparation of the polymer is or contains a choromophore. More preferably none of the reaction steps is performed in the presence of a chromophore. Chromophore are highly coloured materials e.g. dyes. In this way colourless polymers may be prepared which contain no chromophore groups in their structure.

Preferred Absence of Certain Groups

Preferably, no compound in any of the components i) to iii) has any ionic groups.

Reaction Conditions for Components i) to iii)

The reaction between components i), ii) and optionally iii) is preferably performed in a liquid medium. Preferably, the liquid medium is a good solvent for all the components. Preferred liquid media for the reaction of components i), ii) and optionally iii) include 2-pyrrolidone, n-methyl pyrrolidone and sulfolane. The reaction temperature is preferably from 50 to 150° C., more preferably from 70 to 120° C. and especially from 80 to 110° C. The time for the reaction depends on the components used and the presence of catalyst but suitable reaction times are from 1 to 48 hours, more preferably from 2 to 24 hours, especially from 4 to 24 hours and most especially from 4 to 12 hours. Any suitable catalyst which is used in the preparation of polyurethanes may be used. Preferred examples of catalysts are tin salts and hindered amines.

Preferred Pre-Polymers

Preferably, the pre-polymer has no ionic groups, often the pre-polymer will have no or negligible amounts of hydroxyl, amino and thiol groups.

Preferably, the pre-polymer has a weight averaged molecular weight of from 1,000 to 500,000, more preferably from 5,000 to 200,000 and especially from 10,000 to 100,000.

The molecular weight is preferably measured by gel permeation chromatography (GPC). The molecular weight standards employed are preferably polyethylene glycol or more preferably polystyrene. The solvent used for GPC is preferably dimethyl formamide, tetrahydrofuran or acetone.

Preferably, the prepolymer has a negligible or zero acid value.

Component iv)

The compounds in component iv) are selected from organic amines, organic alcohols and organic thiols provided that at least one of the organic compounds in component iv) has at least one ionic group. Preferably, the compounds are selected from mono-amines, mono-alcohols and mono-thiols. The use of mono-functional amines, thiols and alcohols assists in providing a final polymer having a desirable linear structure. The amine may be a primary or a secondary amine.

Preferably, at least one of the compounds in component iv) is a compound of the Formula (2) or (3):

$$L\text{-}X \qquad \text{Formula (2)}$$

wherein:
L is $H_2N$—, HO— or HS—;
X is an optionally substituted organic group having at least one ionic group;

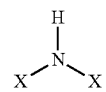

Formula (3)

wherein:
each X independently is an optionally substituted organic group, and at least one of the X groups has an ionic group.

More preferably all of the compounds in component iv) are of the Formula (2) or (3).

In the compounds of Formula (2) it is preferred that L is $H_2N$— or HO—, more preferably $H_2N$—. Such compounds have been found to be particularly effective at post functionalising the pre-polymer.

The optionally substituted organic group X in the Compounds of Formula (2) and (3) may be of any kind without limitation. The organic group may by alkyl, aryl, heterocyclyl or a mixture thereof.

When an X group is an optionally substituted alkyl group, it is preferably optionally substituted $C_{1-20}$ alkyl.

When an X group is an optionally substituted aryl group it is preferably an optionally substituted phenyl or naphthyl group.

When an X group is an optionally substituted heterocyclyl it may be aromatic (heteroaryl) or non aromatic. When X is heterocyclyl it is preferably a 5- or 6-membered ring containing from 1 to 3 atoms selected from N, S and O in the ring. The remaining atoms being carbon atoms.

Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

The optional substituents may be any of those previously mentioned for $R^1$ and $R^2$ groups.

At least some of the compounds in component iv) will have one or more ionic groups.

The ionic group may be cationic or more preferably anionic.

Examples of cationic groups include quaternary amine, pyrridinium, guanide and biguanide groups. These may be in the free base or salt form or a mixture thereof. Suitable salt forms include the sulphate, nitrate, halide and carboxylate salts.

Preferred anionic groups are sulfonic acid, carboxylic acid and phosphorus containing acid groups. Of these carboxylic acid and phosphorus containing acid groups are preferred. Preferred examples of phosphorus containing acids are phosphoric and especially phosphonic acid groups. In our studies we have found that the phosphorus containing acid groups tend to promote particularly good optical density when inks utilising dispersions of pigments stabilised by the polymers prepared in the present invention are printed onto substrates such as plain paper.

The anionic groups may be in the form of the free acid, they may be in the form of a salt or a mixture thereof. Preferably, prior to and during the preparation of the polymer the anionic groups are in the acid form. Salt forms include those with ammonium, organic ammonium, hydroxyl functional organic ammonium and especially alkali metal counter ions. Suitable alkali metals include potassium, sodium and lithium.

Each X group may have from 1 to 3, more preferably 1 or 2 ionic groups.

Preferred examples of compounds of Formula (2) and (3) include aminomethylphosphonic acid, iminodi(methylphosphonic acid), N-methylaminomethylphosphonic acid, 2-aminoethylphosphonic acid, 3-aminopropylphosphonic acid, meta, ortho and para-aminophenylphosphonic acid, 4-aminobenzyl phosphonic acid, alendronic acid, pamidronic acid, neridronic acid, glyphosate, 2-amino-3-phospono propionic acid, 2-amino-4-phosphono butyric acid and the like. Of these aminomethylphosphonic acid and alendronic acid are preferred.

In some cases, some (but not all) of the compounds in component iv) may have no ionic groups. In this way the hydrophilicity of the final polymer can be adjusted in order to provide the best dispersant for a given liquid vehicle or a given particulate solid.

Preferably, the only component present in the preparation of the polymer which has ionic groups is component iv).

The total molar amount of compounds in component iv) can be varied widely. In some instance the same total molar amount of compounds in component iv) to remaining halo triazine (Z) groups in the pre-polymer may be used. It is possible to use less than the required 1:1 stoichiometry to adjust the hydrophilicity of the dispersant. For example the compounds in component iv) may be added in a molar amount corresponding to less than 90 mole %, less than 80 mole %, less than 70 mole % or less than 50 mole % relative to the moles of Z (halo groups attached to triazine rings) groups in the pre-polymer.

It is also possible to use a molar excess of the compounds in component iv).

The reaction between the pre-polymer and component iv) is preferably performed in a liquid medium. Preferred liquid media for this step include organic liquids, water and mixtures thereof. The temperature for the reaction between component iv) and the pre-polymer is preferably from 50 to 150, more preferably from 60 to 100 and especially from 70 to 90° C. The duration of the reaction varies widely but a suitable time is from 1 to 24 hours, especially from 5 to 16 hours and most especially from 6 to 14 hours. The reactions are also preferably performed at a pH of from 7 to 12 and most preferably at a pH of between 9 to 12.

Optional Hydrolysis

Depending on the reaction conditions and the stoichiometries of components used it is possible that the resulting polymer has some remaining Z groups (halo groups attached to a triazine ring). These Z groups may be left as they are. In many cases it is preferable to hydrolyse the remaining Z groups to HO— groups. Preferably, the hydrolysis is performed in water using an acid or base to accelerate hydrolysis. Heating to an elevated temperature of between 60° C. to 90° C. is often used to accelerate the hydrolysis.

Optional Purification

The final polymer prepared by the process according to the present invention may be used directly. It may also be purified to remove impurities from the polymer. Examples of suitable purification methods include filtration and washing, dialysis and especially ultrafiltration.

Preferred Polymer Characteristics

The final polymer preferably has from 0.1 to 10 mmoles, more preferably from 0.5 to 8 mmoles, even more preferably from 0.5 to 5 mmoles and especially from 1 to 3 mmoles of ionic groups per g of polymer. The preferred method of establishing this is by titrimetry, especially potentiometric titration.

Preferably, the final polymer has a weight averaged molecular weight of from 1,000 to 500,000, more preferably from 5,000 to 200,000 and especially from 10,000 to 100,000.

The molecular weight is preferably measured by the same method as used for the pre-polymer.

Preferably, the polymer is soluble in water. More preferably the polymer is soluble in water at 5% by weight when neutralised to 100% stoichiometry with lithium hydroxide. Preferably, the polymer is soluble at 25° C.

The final polymer preferably has anionic groups as previously mentioned and preferred in the section headed Component iv). In the case of the final polymer the anionic groups may be in the acid or more preferably in the salt form. The preferred salt forms are those previously mentioned in the section headed Component iv). A suitable method for preparing these salts is by the addition of a base such as ammonia, an organic amine, an organic alkanolamine or an alkali metal hydroxide. The addition of base is preferably performed after reacting components i) to iv) in the process as defined in the first aspect of the present invention.

Polymer Obtained or Obtainable by the Process

According to a second aspect of the present invention there is provided a polymer obtained or obtainable by the process according to the first aspect of the present invention.

Preferably, the polymer is linear. Preferably, the polymer has a structure wherein the only ionic groups present were introduced from component iv).

Dispersion

According to a third aspect of the present invention there is provided a dispersion comprising a polymer according to the second aspect of the present invention, a particulate solid and a liquid vehicle.

The particulate solid in the dispersion preferably has a Z— averaged particle size of from 50 to 300 nm, more preferably from 70 to 200 nm and especially from 80 to 150 nm. The particle size is preferably measured by a light scattering device especially a Malvern Zetasizer™.

Preferably, the dispersion comprises:
i) 0.1 to 40 parts, more preferably 0.1 to 20 parts of the polymer;
ii) 0.1 to 40 parts, more preferably 0.1 to 20 parts of the particulate solid;
iii) 50 to 99.8, more preferably 60 to 99.8 parts of the liquid vehicle;
wherein the sum of the parts i) to iii) is 100 parts and all parts are by weight.

Preferably, the polymer is at least partially adsorbed onto the surface of the particulate solid. In this way the polymer acts as a dispersant so as to colloidally stabilise the particulate solid.

The amount of polymer in the dispersion (or ink) is preferably from 1 to 150%, more preferably from 1 to 40%, especially from 1 to 30% and more especially from 3 to 20% by weight based on the weight of particulate solid.

A preferred method for preparing the dispersions according to the third aspect of the present invention is to disperse, especially to comminute, a composition comprising the polymer according to the second aspect of the present invention, a particulate solid and a liquid medium. Dispersion processes include stirring, blending, shaking as well as milling and ultrasonication etc.

By the word comminute we mean only those processes which tend to significantly reduce the particle size of the particulate solid. Comminution includes for example ultrasonication, bead milling, microfluidizing and high pressure homogenising. Comminution does not include low shear dispersion processes such as stirring, shaking, tumbling and the like. Preferably, the polymer according to the second aspect of the present invention is the only dispersant present during the dispersion or comminution step.

Particulate Solid

The particulate solid may be of any kind. Preferably the particulate solid is a pigment. The pigment may comprise and preferably is an inorganic or organic pigment material or mixture thereof which is insoluble in the liquid vehicle. By insoluble we mean having a solubility of no more than 1%, more preferably no more than 0.1% by weight in the liquid vehicle. The solubility is preferably measured at a temperature of 25° C. The solubility is preferably measured at a pH of 8. Preferably, the solubility is measured in water, more preferably deionized water.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

For ink jet especially suitable pigments are carbon blacks, C.I. Pigment Red 122, C.I. Pigment Blue 15:3 and C.I. Pigment Yellow 74. Of course there are many alternative pigments.

The pigment is preferably not surface treated so as to covalently bind water-dispersing groups onto its surface. Preferably, the pigment is not dispersible in water without the aid of a dispersant.

Liquid Vehicle for the Dispersion

The liquid vehicle may be wholly organic but preferably is or comprises water (i.e. is aqueous). We have found that the polymer according to the second aspect of the present invention is especially suitable as a dispersant for aqueous liquid vehicles.

In some cases, the liquid vehicle comprises water and optionally one or more water-miscible organic liquids. In some instances it is preferred that the liquid vehicle comprises water and less than 30% by weight, more preferably less than 20% by weight and especially less than 10% by weight of water-miscible organic liquids relative to the total amount of liquids present in the dispersion. In some cases the liquid vehicle for the dispersion comprises of water and no organic liquid. These dispersions facilitate more formulation options.

Preferred water-miscible organic liquids for inclusion into the liquid vehicle include:

i) $C_{1-6}$-alkanols, preferably methanol, ethanol, n-propanol, isopropanol, n-butanol, sec-butanol, tert-butanol, n-pentanol, cyclopentanol and cyclohexanol;

ii) linear amides, preferably dimethylformamide or dimethylacetamide;

iii) water-miscible ethers, preferably tetrahydrofuran and dioxane;

iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol;

v) triols, preferably glycerol and 1,2,6-hexanetriol;

vi) mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether;

vii) cyclic amides, preferably 2-pyrrolidone, N-methyl-2-pyrrolidone, N-ethyl-2-pyrrolidone, caprolactam and 1,3-dimethylimidazolidone.

Preferably, the liquid vehicle comprises water and optionally 1 or more, especially optionally from 1 to 3, water-miscible organic liquids.

Encapsulated Particulate Solids

The dispersions according to the third aspect of the present invention can be used to prepared encapsulated particulate solids. To form an encapsulated particulate solid the polymer in the dispersion is cross-linked in the presence of a particulate solid and a liquid vehicle thereby encapsulating the solid particles with a cross-linked polymer shell.

The particulate solid is preferably a pigment as mentioned and preferred above. The liquid vehicle is preferably as mentioned above in the section headed liquid vehicle for the dispersion.

The cross-linking can be achieved by using a self cross-linking polymer. More preferably, a cross-linking agent is used to cross-link the polymer. Examples of suitable combinations of cross-linkable groups in the polymer and cross-linking groups in the cross-linking agent are listed in WO 2005/061087 at page 6, Table 1. Of these it is preferred that the cross-linkable group in the polymer is an ionic group especially a —$CO_2H$ group and/or a phosphorus containing acid group or salt thereof. For these cross-linkable groups the cross-linking agent is preferably selected from melamines, carbodiimides, oxetanes, isocyanates, aziridines and especially epoxides. Preferably, cross-linking is effected by means of an epoxy cross-linking agent.

Especially suitable encapsulation and cross-linking chemistry can be found in PCT patent publication WO2006/064193.

We have found that the encapsulated particulate solids tend to have even better colloidal stability towards liquid vehicles which comprise water and relatively high proportions of water-miscible organic liquids.

Ink

Inks preferably comprise at least one colorant such as a dye or a pigment.

Preferably, in inks the particulate solid is a pigment. Preferably, no other colorant is present in the ink.

Preferably, the ink (especially an ink jet printing ink) comprises a dispersion according to the third aspect of the present invention.

According to a fourth aspect of the present invention there is provided an ink comprising a dispersion according to the third aspect of the present invention wherein the particulate solid is a pigment.

Preferably, the ink is an ink jet printing ink.

Preferably, the ink has a viscosity of less than 30 mPa·s, more preferably less than 20 mPa·s and especially less than 10 mPa·s. The viscosity is preferably at least 2 mPa·s. Preferably, the viscosity is Newtonian. Preferably, the viscosity is measured at 25° C. Preferably, the viscosity is measured using a shear rate of 100 s$^{-1}$. The viscosity is preferably measured using a cone and plate geometry. A preferred apparatus for measuring the viscosity is a TA Instruments rheometer.

Preferably, the ink comprises:
i) 0.1 to 10 parts, more preferably from 1 to 10 parts of polymer according to the second aspect of the present invention;
ii) 0.1 to 10 parts, more preferably from 1 to 10 parts of a pigment;
iii) 80 to 99.8 parts, more preferably 80 to 98 parts of a liquid vehicle
wherein all parts are by weight.

The ratio of polymer to pigment is as hereinbefore preferred. Preferably, the ink has a surface tension of 20 to 65 dynes/cm, more preferably 30 to 60 dynes/cm, when measured at a temperature of 25° C. The surface tension is preferably measured using a Kibron AquaPi.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

The ink has preferably been treated so as to remove particles having a particle size of greater than 1 micron. This may be done by centrifugation or filtration.

The ink preferably comprises a liquid vehicle which is or comprises water. More preferably the liquid vehicle also comprises at least one water-miscible organic liquid. Preferably, the weight ratio of water to water-miscible organic liquid when both are present in the liquid medium may be from 99:1 to 5:95, more preferably 95:5 to 50:50, especially 95:5 to 70:30. Preferred water-miscible organic liquids are mentioned above. These inks are especially useful for ink jet as they assist in preventing any polymer from depositing on the ink jet printer nozzles. These water miscible organic liquids also help in the firing, substrate wetting, surface tension and substrate penetration characteristics of the ink.

The ink may optionally contain one of more ink additives. Preferably, the ink further comprises one or more additives selected from viscosity modifiers, pH buffers, metal chelating agents, surfactants, corrosion inhibitors, biocides, dyes, water miscible organic solvent(s) and/or kogation reducing additives.

Ink Jet Printer Cartridge

According to a fifth aspect of the present invention there is provided an ink jet printer cartridge comprising a chamber wherein an ink is present in the chamber and the ink is according to the fourth aspect of the present invention.

Substrate

According to a sixth aspect of the present invention there is provided a substrate printed with an ink according to the fourth aspect of the present invention. The substrate may be of any kind including paper, glass, metal, material and plastic. We have found that the inks according to the fourth aspect of the present invention print onto substrates to provide prints having especially good optical density even on plain paper. The prints also demonstrate particularly good wet and dry rub-fastness.

Use of the Polymer for Dispersing

According to a seventh aspect of the present invention there is provided the use of a polymer according to the second aspect of the present invention for dispersing (especially comminuting) a mixture comprising the polymer, the particulate solid and the liquid vehicle. The use of the polymer is especially good for dispersing and comminuting pigments. The particle size of the resulting particulate solid is preferably as mentioned above.

Examples

The present invention will now be illustrated by the following examples in which all parts are by weight unless stated to the contrary.

1. Preparation of Polymer Solution (1)

1.1 Preparation of the Compound of Formula (1) [Monomer Solution (1)]

In step 1.1 the following compound of Formula (1a) was prepared.

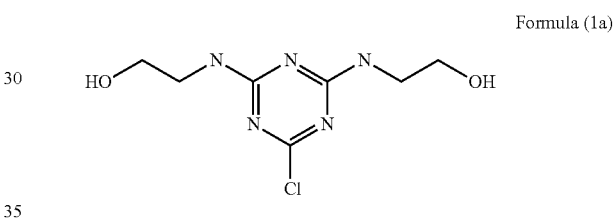

Formula (1a)

Cyanuric chloride (0.50 mol, 92.2 g) was suspended in water (300 ml) and cooled to a temperature of from 0 to 5° C. in a reactor. A solution of ethanolamine (1.0 mol, 61.3 g) in water (50 ml) was added dropwise to the reactor contents whilst maintaining the temperature at 0 to 5° C. to form a reaction mixture.

On completion of the addition the reaction mixture was warmed to a temperature of 40 to 45° C. and stirred at this temperature for 3 hours whilst slowly adding a solution of sodium hydroxide (1.0 mol, 40 g) in water (100 ml) to maintain the pH at 6-7.

The reaction mixture was then stirred at a temperature of 60° C. for 2 hours and then allowed to cool to a temperature of 25° C.

The resulting product was collected by filtration, washed with pure water (5×100 ml) and dried in a vacuum oven at 50° C. to give 115 g of a white solid. The resulting dry product was dissolved in N methyl pyrrolidone (460 g) and stored over 4 A molecular sieves to give a 20% by weight solution of the compound of Formula (1a). This was designated Monomer Solution (1).

1.2 Preparation of the Pre-Polymer Solution (1)

A mixture of the Monomer Solution (1) prepared in step 1.1 (0.200 mol, 116.85 g), ethylene glycol (0.406 mol, 12.59 g), isophorone diisocyanate (0.576 mol, 64.04 g) and N-methyl pyrrolidone (6.52 g) were stirred and heated to a temperature of 50° C. and 2 drops of tin ethylhexanoate were added. This formed a reaction mixture. The reaction mixture was stirred at a temperature of 95 to 100° C. for a period of 18 hours. N-methyl pyrollidone (200 g) was added to the reaction mixture which was allowed to cool to a temperature of 25° C. to give a 25% by weight solution of the desired pre-polymer in N-methyl pyrrolidone. This was designated Pre-polymer Solution (1).

Pre-polymer (1) had a number average molecular weight of 23,345 and a weight average molecular weight of 39,115 as measured by GPC using the preferred method i.e. polystyrene standards and dimethyl formamide solvent.

1.3 Preparation of Polymer Solution (1)

A mixture of the Pre-polymer Solution (1) prepared in step 1.2 (100 g) and aminomethanephosphonic acid (5.7 g) was stirred and heated at a temperature of 80° C. to form a reaction mixture. A solution of tetrabutylammonium hydroxide (26 g) in water (40 ml) was added to the reaction mixture which was subsequently stirred and heated at a temperature of 80° C. for 10 hours. The reaction mixture was cooled to a temperature of 25° C., added to water (2000 ml) to give a solution and then acidified by the addition of concentrated hydrochloric acid until the pH was reduced to 0.5. The resultant precipitate was collected by filtration and then suspended in water (2000 ml). The pH of the suspension was adjusted to 11 by the addition of lithium hydroxide and then the suspension was stirred for 1 hour. Following acidification as described above the precipitate was collected, suspended in water (500 ml) at pH=11 (LiOH) and dialysed to a low conductivity (<100 µS cm$^{-1}$). The dialysed solution was concentrated under reduced pressure to give 200 g of a yellow solution which contained the desired Polymer at a concentration of 8.7% by weight. This was Polymer Solution (1).

Phosphorus elemental analysis of a sample of the dried Polymer Solution (1) indicated a content of 2.8% wt/wt of Phosphorus relative to the polymer. This equates to an acid value of 1.8 mmol/g.

2. Preparation of Polymer (2)

The preparation of Polymer (2) was as described above in steps 1.1 to 1.3 except that the isophorone diisocyanate used in stage 1.2 was replaced with a molar equivalent of Methylene Diphenyl Diisocyanate. The dialysed solution was evaporated under reduced pressure to give 28.6 g of a brown solid.

Phosphorus elemental analysis of a sample of Polymer (2) indicated a content of 2.3% wt/wt of Phosphorus relative to the polymer. This equates to an acid value of 1.5 mmol/g.

3. Preparation of Polymer Solution (3)

The preparation of Polymer solution (3) was as described above in steps 1.1 to 1.3 except that the aminomethanephosphonic acid used in stage 1.3 was replaced with a molar equivalent of 3-aminopropionic acid. The dialysed solution was concentrated under reduced pressure to give 86 g of a yellow solution which contained the desired Polymer at a concentration of 22.9% by weight. This was Polymer Solution (3).

Titration of a sample of polymer solution (3) with 0.1M HCl indicated an acid value of 0.78 mmol/g.

4. Preparation of Polymer Solution (4)

The preparation of Polymer solution (4) was as described above in steps 1.1 to 1.3 except that the aminomethanephosphonic acid used in stage 1.3 was replaced with a molar equivalent of 4-aminobutyric acid. The dialysed solution was concentrated under reduced pressure to give 101 g of a yellow solution which contained the desired Polymer at a concentration of 25.2% by weight. This was Polymer Solution (4).

Titration of a sample of polymer solution (4) with 0.1M HCl indicated an acid value of 0.86 mmol/g.

5 Preparation of Comparative Polymer Solution (1)

5.1 Preparation of Comparative Pre-Polymer Solution (1)

Dimethylol propionic acid (32.99 g), sulfolane (172.5 g) and isophorone diisocyanate (82.01 g) were charged to a reactor at 25° C. The reactor contents were stirred and tin octoate (0.0107 g) was added to the reactor.

The reactor was heated to and maintained at about 95° C. for 1.5 hours at which point heating was removed and the reactor contents sampled in order to determine the isocyanate content by titration. The isocyanate content was found to be 3.4% w/w.

The resulting pre-product was designated Comparative Pre-polymer Solution (1).

5.2 Preparation of Comparative Polymer Solution (1)

De-ionised water (217.66 g), potassium hydroxide aqueous solution 10% w/w (100.61 g) and hydrazine (2.653 g) were added to a second reactor. The second reactor contents were stirred at 40° C. and Comparative Pre-polymer Solution (1) (262 g) formed in step 5.1 was added to the second reactor over 30 minutes. The temperature of Comparative Pre-polymer Solution (1) during the addition was maintained at about 70° C. The temperature of the second reactor was maintained at about 40° C. throughout addition of Comparative Pre-polymer Solution (1). When addition was complete stirring was continued for 2 hours during which time the reaction was allowed to cool to 25° C.

This was designated as Comparative Polymer Solution (1). The aqueous solution contained approximately 20% by weight of Comparative Polymer (1).

Comparative Polymer (1) had a number average molecular weight of 17,055 and a weight average molecular weight of 46,853 as determined by GPC using the preferred method i.e. polystyrene standards and dimethyl formamide solvent.

The calculated acid value of Comparative Polymer (1) was 2.10 mmol/g.

6. Preparation of Mill-Bases

6.1 Black Mill-Base (1)

Pigment powder (51 g of NIPex® 170IQ Carbon Black pigment, ex Evonik Degussa), Polymer Solution (1) prepared in 1.3 (59 g) and water (230 g) were mixed together to form a pre-mixture.

The pre-mixture was thoroughly mixed together using a Silverson™ mixer for 15 minutes. After mixing the mixture was transferred to a horizontal bead mill containing 0.38 mm beads. The mixture was then comminuted (milled) for 3 hours.

The milling beads were then separated from the milled mixture. This resulted in Black Mill-base (1). The pigment particles in the resulting mill-base had a Z-Average particle size of 87 nm as measured by the preferred method, i.e. a Malvern Zetasizer™.

6.2 Comparative Black Mill-Base (1)

Pigment powder (165 g of NIPex™ 170IQ Carbon Black pigment, ex Evonik Degussa), Comparative Polymer Solution (1) prepared in 5.2 (167 g) and water (768 g) were mixed together to form a pre-mixture. The pre-mixture was thoroughly mixed together using a Silverson™ mixer for 5 minutes. After mixing the mixture was transferred to a horizontal bead mill containing 0.38 mm beads. The mixture was then comminuted (milled) for 5 hours.

The milling beads were then filtered from the milled mixture. This resulted in Comparative Black Mill-base (1). The pigment particles in the resulting mill-base had a Z-Average average particle size of 110 nm as measured by the preferred method, i.e. a Malvern Zetasizer™.

7 Preparation of Encapsulated Particulate Solids

7.1 Cross-Linking so as to Encapsulate

The mill-bases prepared above in points 6.1 to 6.2 were adjusted to a pigment content of about 5% to 10% by weight by the addition of water.

The polymer in each mill-base was then cross-linked using polyglycerol polyglycidyl ether (Denacol™ EX-521 obtained from Nagase ChemteX, with weight per epoxy=181, hereafter abbreviated as EX-521) as a cross-linking agent. This cross-linked some of the phosphonic acid or carboxylic acid groups in the polymers and thereby encapsulated the pigment particles. The cross-linking reaction was performed in the presence of boric acid (obtained from Aldrich). In each case a mixture was prepared containing the amounts of the components as specified in Table 1. The cross-linking reaction was effected by heating the above described mixture to a temperature of about 65° C. for 5 hours. This prepared a range of different Encapsulated pigment dispersions with the references as indicated in column 1 of Table 1.

TABLE 1

Encapsulated pigment dispersions

| Encapsulated Pigment Dispersion reference | Mill-base used | Mill-base pigment content (%) | Mill-base (g) | Cross-linker (g) | Boric acid (g) |
|---|---|---|---|---|---|
| Encapsulated Black Dispersion (1) | Black Mill-base (1) | 5 | 300 | EX-521 (0.10) | 0.028 |
| Encapsulated Black Dispersion (2) | Black Mill-base (1) | 5 | 300 | EX-521 (0.26) | 0.074 |
| Comparative Encapsulated Black Dispersion (1) | Comparative Black Mill-base (1) | 10 | 60 | EX-521 (0.129) | 0.037 |
| Comparative Encapsulated Black Dispersion (2) | Comparative Black Mill-base (1) | 10 | 75 | EX-521 (0.322) | 0.093 |

8. Ultrafiltration

The Encapsulated Black Dispersions prepared above in 7.1 were each purified by means of ultrafiltration using membrane having a molecular weight cut off of 50 kD. The Encapsulated Black Dispersions were diafiltered with approximately 6 wash volumes of pure deionized water per 1 volume of the Encapsulated Black Dispersion. The ultrafiltration membrane was then used to concentrate the encapsulated dispersion back to a solids content of around 9 to 10% by weight.

9. Preparation of Inks

Several of the above Encapsulated Black Dispersions and Black Mill-bases were used to prepare Inks having the following composition:

| Ink Vehicle | |
|---|---|
| Pigment | X parts |
| 2-Pyrrolidone | 3.00 parts |
| Glycerol | 15.00 parts |
| 1,2 Hexane diol | 4.00 parts |
| Ethylene glycol | 5.00 parts |
| Surfynol ™ 465 | 0.50 parts |
| Pure water | sufficient to make 100 parts |

Surfynol$^{RTM}$ 465 is a surfactant available from Airproducts.

X Parts of Pigment 6 parts of black pigment on an active or solids basis were used in all cases (a little more than 60 parts of Encapsulated Black Dispersion when the solids content is 10% by weight). By example, in the case of Encapsulated Black Dispersions the mass of the encapsulated shell surrounding the pigment is not counted as active or solid pigment. This method allows the desired shade or colour intensity to be better controlled.

Using the above ink composition, for example, Encapsulated Black Dispersion (1) was used to prepare Black Ink (1). The exact correspondence of references is outlined fully in Table 2.

TABLE 2

| Ink | Encapsulated Black Dispersion |
|---|---|
| Black Ink (1) | Encapsulated Black Dispersion (1) |
| Black Ink (2) | Encapsulated Black Dispersion (2) |
| Black Ink (3) | Black Mill-base (1) |
| Comparative Black Ink (1) | Comparative Encapsulated Black Dispersion (1) |
| Comparative Black Ink (2) | Comparative Encapsulated Black Dispersion (2) |

10. Preparation of Prints

Each of the Inks described above in point 9 were printed onto plain (untreated) paper, namely Xerox 4200 and Canon GF500 paper. Printing was performed by means of an Epson SX218 ink jet printer printing 100% blocks of black.

11. Measurement of Reflectance Optical Density

For each print the Reflectance optical density (ROD) was measured using a Gretag Macbeth key wizard V2.5 Spectrolino photodensitometer instrument, illuminated using a D65 light source at an observer angle of 2° and with no filter fitted. Measurements were taken at at least two points along the print and were then averaged.

12. Results of Optical Density Measurements

The results of the ROD measurements are summarised below in Table 3.

TABLE 3

ROD of Prints obtained from Inks

| Ink | Polymer Dispersant Solution | Cross-linker | ROD on Xerox 4200 | ROD on Canon GF500 |
|---|---|---|---|---|
| Black Ink (1) | Polymer Aqueous Solution (1) | EX-521 | 1.28 | 1.28 |
| Black Ink (2) | Polymer Aqueous Solution (1) | EX-521 | 1.30 | 1.29 |
| Black Ink (3) | Polymer Aqueous Solution (1) | None | 1.33 | 1.32 |
| Comparative Black Ink (1) | Comparative Polymer Aqueous Solution (1) | EX-521 | 1.18 | 1.21 |
| Comparative Black Ink (2) | Comparative Polymer Aqueous Solution (1) | EX-521 | 1.19 | 1.20 |

From Table 3, it can readily be seen that the polymer prepared by the process according to the present invention can be used to prepare ink jet printing inks which provide especially good reflectance optical density (ROD) values when printed onto plain paper. In contrast the comparative Inks containing a different polymer have much lower ROD values.

13. Further Inks

The further inks described in Tables I and II may be prepared wherein two dispersions Encapsulated Black Dispersion (1) [Labelled simply as 1 in column 1] and Black Mill-base (1) [Labelled simply as 2 in column 1] are as mentioned above and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Tables I and II:
PG=propylene glycol
DEG=diethylene glycol
NMP=N-methyl pyrrolidone
DMK=dimethylketone
IPA=isopropanol
MEOH=methanol
2P=2-pyrrolidone
MIBK=methylisobutyl ketone
P12=propane-1,2-diol
BDL=butane-2,3-diol
Surf=Surfynol™ 465 from Air Products
PHO=$Na_2HPO_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| Dispersion | Mill-base Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 |  | 6 | 3 |  |  |  |  | 5 |  | 1 |  |
| 1 | 30 | 59.8 |  | 5 | 5 |  | 0.2 |  |  |  |  |  |  |  |
| 1 | 40 | 45 | 3 |  | 3 | 3 |  |  |  | 5 | 1 |  |  |  |
| 1 | 40 | 51 |  | 8 |  |  |  |  |  |  |  |  | 1 |  |
| 1 | 40 | 45.8 | 5 |  |  |  |  | 0.2 | 4 |  |  | 5 |  |  |
| 1 | 40 | 41 |  |  | 9 |  | 0.5 | 0.5 |  |  | 9 |  |  |  |
| 1 | 40 | 10 | 4 | 15 | 3 | 3 |  |  | 6 | 10 | 5 | 4 |  |  |
| 1 | 40 | 30 |  | 20 |  |  |  |  | 9 |  |  |  |  | 1 |
| 1 | 50 | 25 | 5 | 4 |  | 5 |  |  |  | 6 |  | 5 |  |  |
| 1 | 50 | 29.7 | 3 | 5 | 2 | 10 |  | 0.3 |  |  |  |  |  |  |
| 2 | 50 | 15 |  | 5 | 4 | 6 |  |  | 5 | 4 | 6 | 5 |  |  |
| 2 | 50 | 46 |  |  |  |  |  |  |  | 4 |  |  |  |  |
| 2 | 40 | 50 | 5 |  |  |  |  |  | 5 |  |  |  |  |  |
| 2 | 40 | 40 | 2 | 6 | 2 | 5 |  |  | 1 |  |  | 4 |  |  |
| 2 | 40 | 40 |  | 5 |  |  |  |  |  |  |  | 15 |  |  |
| 2 | 40 | 44 |  |  | 11 |  |  |  |  |  |  | 5 |  |  |
| 2 | 50 | 30 | 2 |  |  | 10 |  |  |  | 2 |  | 6 |  |  |
| 2 | 50 | 39.7 |  |  |  | 7 | 0.3 |  | 3 |  |  |  |  |  |
| 2 | 40 | 29 | 2 | 20 | 2 | 1 |  |  |  |  | 3 | 3 |  |  |
| 2 | 40 | 51 |  |  | 4 |  |  |  |  |  | 5 |  |  |  |
| 2 | 40 | 40 |  |  |  |  |  |  |  |  |  |  | 20 |  |
| 2 | 40 | 40 |  |  |  |  |  |  |  |  |  |  |  | 20 |

TABLE II

| Dispersion | Mill-base content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 1 | 30 | 49.8 | 15 |  |  | 0.2 |  |  |  |  | 5 |  |  |  |
| 1 | 30 | 58.8 |  |  | 5 |  |  |  |  | 1.2 | 5 |  |  |  |
| 1 | 40 | 44.6 | 5 | 5 |  | 0.1 | 4 | 0.2 |  |  |  |  |  | 1 |
| 1 | 40 | 5 |  |  | 6 | 4 | 5 |  |  |  | 0.12 |  | 6 |  |
| 1 | 40 | 49.8 | 4 | 8 |  |  |  |  |  |  |  | 6 |  |  |
| 1 | 40 | 8 |  |  | 10 |  |  | 0.3 |  | 5 | 0.2 |  |  |  |
| 1 | 50 | 41.7 |  | 5 | 5 |  |  | 0.3 |  |  |  |  |  |  |
| 1 | 50 | 44.8 |  | 10 | 4 |  |  |  | 1 |  | 4 | 11 |  |  |
| 1 | 40 | 39.7 | 4 | 10 | 3 |  |  |  | 2 |  | 6 |  |  |  |
| 1 | 40 | 20 |  |  | 6 |  |  |  |  |  | 3 |  |  |  |
| 2 | 40 | 35 |  |  | 9 | 7 |  | 2 |  | 0.95 | 5 |  | 1 |  |
| 2 | 40 | 51 | 5 | 11 |  |  |  |  |  |  | 6 |  |  |  |
| 2 | 50 | 35.0 |  |  | 7 |  |  |  |  |  | 7 |  |  |  |
| 2 | 50 | 5 | 5 | 5 |  | 4.1 |  | 0.2 | 0.1 | 5 | 0.1 | 5 |  |  |
| 2 | 40 | 38 |  |  | 10 |  | 1 |  |  |  |  |  |  |  |
| 2 | 40 | 36 |  |  |  |  |  | 10 |  |  |  |  |  |  |
| 2 | 30 | 24.5 |  |  | 5 |  |  | 12 |  |  | 5 |  |  |  |
| 2 | 30 | 50 | 2 |  | 8 |  |  | 15 |  |  | 5 |  |  |  |
| 2 | 40 | 50 |  |  |  |  |  | 8 |  |  | 12 |  |  |  |
| 2 | 40 | 48 |  |  | 10 |  |  |  |  |  |  |  | 10 |  |
| 2 | 40 | 40 |  |  |  |  |  |  |  |  |  | 10 |  | 10 |

The invention claimed is:

1. A process for preparing a polymer comprising reacting at least the components i), ii) and optionally iii) to form a pre-polymer:
i) a compound of the Formula (1);

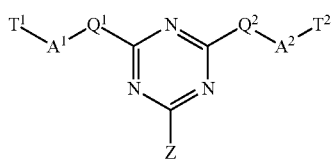

Formula (1)

wherein:
$T^1$ and $T^2$ are each independently HO—, HS— or $HNR^1$—;
$Q^1$ and $Q^2$ independently are —$NR^2$—;
$A^1$ and $A^2$ independently are an optionally substituted divalent organic linking group;
Z is a halogen;
$R^1$ when present is H or an optionally substituted alkyl, aryl or heterocyclyl group;
$R^2$ is H or an optionally substituted alkyl, aryl or heterocyclyl group;
ii) a diisocyanate;
iii) optionally an isocyanate reactive compound;
and then reacting the pre-polymer with at least component iv):
iv) one or more compounds selected from an organic amine, alcohol or thiol provided that at least one of the organic compounds in component iv) has at least one ionic group;
and wherein the said optional substituents are each independently selected from the group consisting of —$NO_2$, CN, halo, —$NHC(O)C_{1-6}$alkyl, —$SO_2NHC_{1-6}$alkyl, —$SO_2C_{1-6}$alkyl, —$C_{1-6}$alkyl, —$OC_{1-6}$alkyl, —$OC(O)C_{1-6}$alkyl, polypropyleneoxide ending in a $C_{1-6}$alkyl group and polyethyleneoxide ending in a $C_{1-6}$alkyl group.

2. The process according to claim 1 wherein at least one of the compounds in component iv) is a compound of the Formula (2) or (3):

L-X    Formula (2)

wherein:
L is $H_2N$—, HO— or HS—;
X is an optionally substituted organic group having at least one ionic group;

Formula (3)

wherein:
each X independently is an optionally substituted organic group, and at least one of the X groups has an ionic group;
and wherein the said optional substituents are each independently selected from the group consisting of —NO2, CN, halo, —NHC(O)C1-6alkyl, —SO2NHC1-6alkyl, —SO2C1-6alkyl, —C1-6alkyl, —OC1-6alkyl, —OC(O)C1-6alkyl, polypropyleneoxide ending in a C1-6alkyl group and polyethyleneoxide ending in a C1-6alkyl group.

3. The process according to claim 1 wherein $T^1$ and $T^2$ are HO— and/or $A^1$ and $A^2$ are independently selected from —$(CH_2)_{1-20}$— groups.

4. The process according to claim 1 resulting in a polymer having a weight averaged molecular weight of from 1,000 to 500,000 as measured by gel permeation chromatography.

5. The process according to claim 1 wherein the resulting polymer has 0.5 to 8 mmoles of ionic groups per g of polymer.

6. The process according to claim 1 wherein the compounds in component iv) are added in a molar amount corresponding to less than 80 mole % relative to the moles of Z groups in the pre-polymer.

7. The process according to claim 1 wherein the remaining un-reacted Z groups are subsequently hydrolysed to OH groups.

8. The process according to claim 1 wherein component iii) is present.

9. The process according to claim 1 wherein the isocyanate reactive compound has only two groups selected from hydroxyl, thiol, amino and hydrazo groups and the isocyanate reactive compound has no ionic groups.

10. The process according to claim 1 wherein at least some of the ionic groups are selected from carboxylic acid, sulfonic acid and phosphorus containing acid groups and at least some of the ionic groups present in the compounds in component iv) are carboxylic acid or phosphorus containing acid groups.

11. The process according to claim 2 wherein $T^1$ and $T^2$ are HO—, $A^1$ and $A^2$ are independently selected from —$(CH_2)_{1-20}$— groups, the polymer has a weight averaged molecular weight of from 1,000 to 500,000 as measured by gel permeation chromatography, the polymer has 0.5 to 8 mmoles of ionic groups per g of polymer, the compounds in component iv) are added in a molar amount corresponding to less than 80 mole % relative to the moles of Z groups in the pre-polymer.

12. A polymer obtained by the process according to claim 1.

13. A dispersion comprising a polymer according to claim 12, a particulate solid and a liquid vehicle.

14. A dispersion according to claim 13 wherein the polymer has been cross-linked in the presence of the particulate solid and the liquid vehicle thereby encapsulating the solid particles.

15. An ink comprising a dispersion according to claim 13 wherein the particulate solid is a pigment.

16. The process according to claim 11 wherein the remaining un-reacted Z groups are subsequently hydrolysed to OH groups.

17. The process according to claim 11 wherein component iii) is present.

18. A polymer obtained by the process according to claim 11.

19. A dispersion comprising a polymer according to claim 18, a particulate solid and a liquid vehicle.

20. The dispersion according to claim 19 wherein the polymer has been cross-linked in the presence of the particulate solid and the liquid vehicle thereby encapsulating the solid particles.

21. An ink comprising a dispersion according to 19 wherein the particulate solid is a pigment.

* * * * *